United States Patent [19]
Cherney et al.

[11] Patent Number: 5,897,123
[45] Date of Patent: Apr. 27, 1999

[54] TAG AXLE PIVOT

[75] Inventors: Mark J. Cherney, Omro; Robert W. Wallin, Oshkosh; Donald H. Verhoff, Oshkosh; David W. Archer, Oshkosh, all of Wis.

[73] Assignee: Oshkosh Truck Corporation, Oshkosh, Wis.

[21] Appl. No.: 08/924,107

[22] Filed: Sep. 5, 1997

[51] Int. Cl.⁶ .................................................. B60G 11/26
[52] U.S. Cl. .................... 280/86.5; 280/43.17; 280/81.1; 180/209
[58] Field of Search ............................... 280/86.5, 43.17, 280/80.1, 43, 81.1; 180/209, 24.02

[56] References Cited

U.S. PATENT DOCUMENTS

| | | | |
|---|---|---|---|
| 4,762,421 | 8/1988 | Christensen et al. | 180/209 |
| 5,018,755 | 5/1991 | McNeilus et al. | 280/81.1 |
| 5,498,021 | 3/1996 | Christenson | 280/86.5 |
| 5,540,454 | 7/1996 | Van Denberg et al. | 280/81.1 |
| 5,597,174 | 1/1997 | Christenson et al. | 280/86.5 |
| 5,823,629 | 10/1998 | Smith et al. | 180/209 |

*Primary Examiner*—Christopher P. Ellis
*Attorney, Agent, or Firm*—Foley & Lardner

[57] ABSTRACT

The present invention provides a work vehicle having a frame and an auxiliary axle system having an arm assembly including a pair of arms, an elongate tube extending between the arms and having an end attached to each of the arms, a pair of levers attached to the tube, and cylinder blocks extending between the levers; a cylinder assembly including a first cylinder shaft extending between the cylinder blocks and having an end attached to each of the cylinder blocks, a cylinder cross member attached to the frame, a second cylinder shaft attached to the cylinder cross member, and a hydraulic cylinder having one end attached to the first cylinder shaft and another end attached to the second cylinder shaft; and a rear assembly including a rear cross member attached to the frame, a pair of pivot blocks attached to the rear cross member, and a pivot shaft extending between the pivot blocks and having an end attached to each of the cylinder blocks. The arm assembly is pivotally mounted to the rear assembly and is actuated by the cylinder assembly.

19 Claims, 8 Drawing Sheets

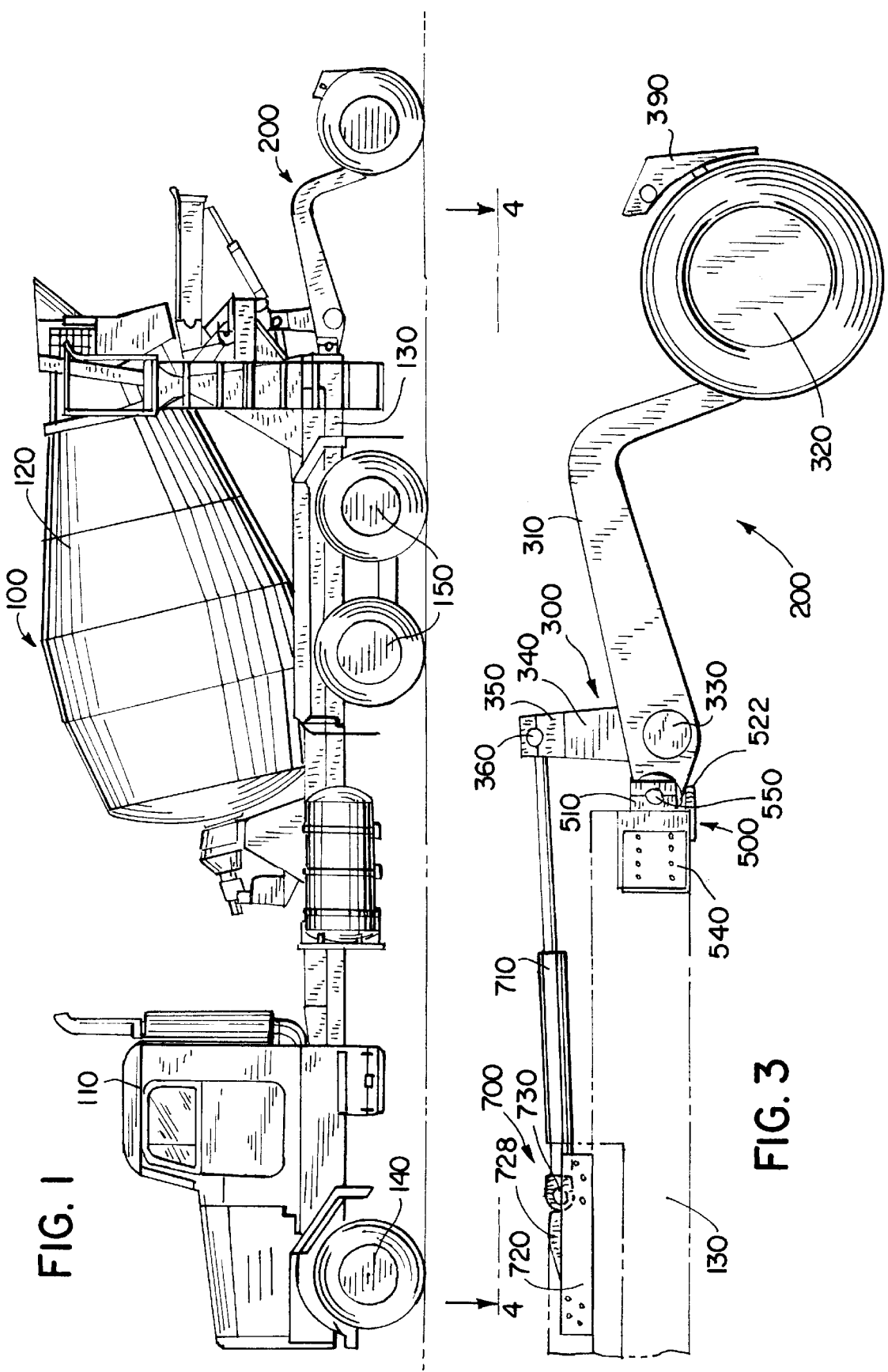

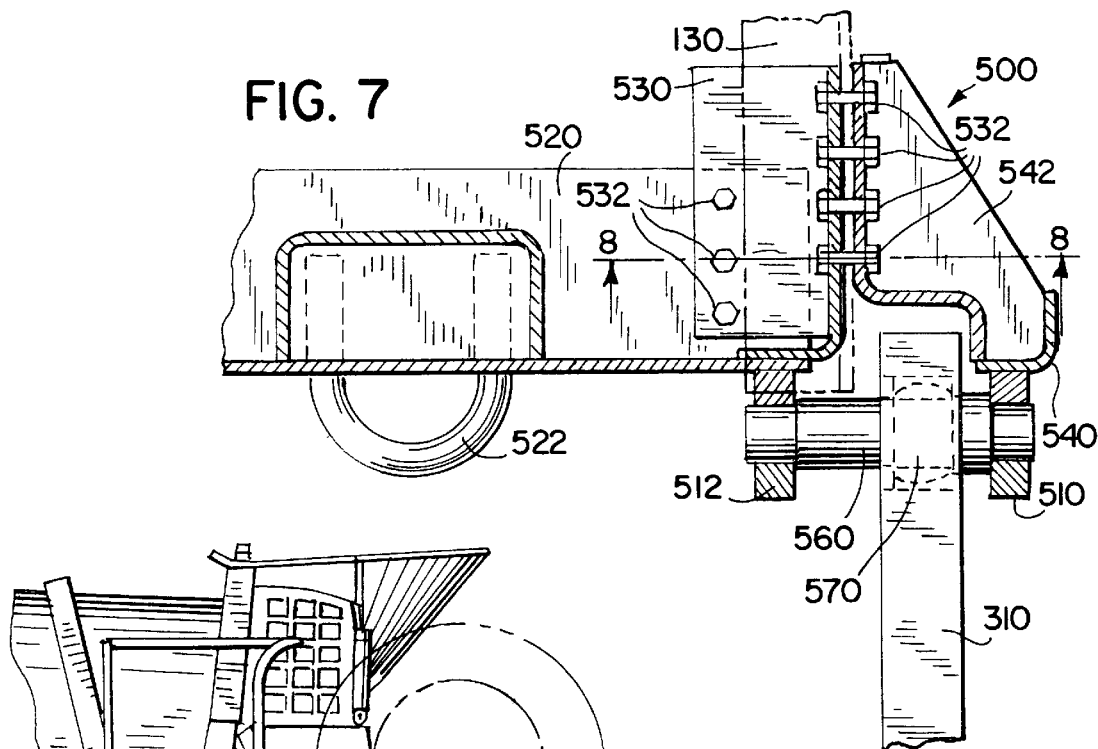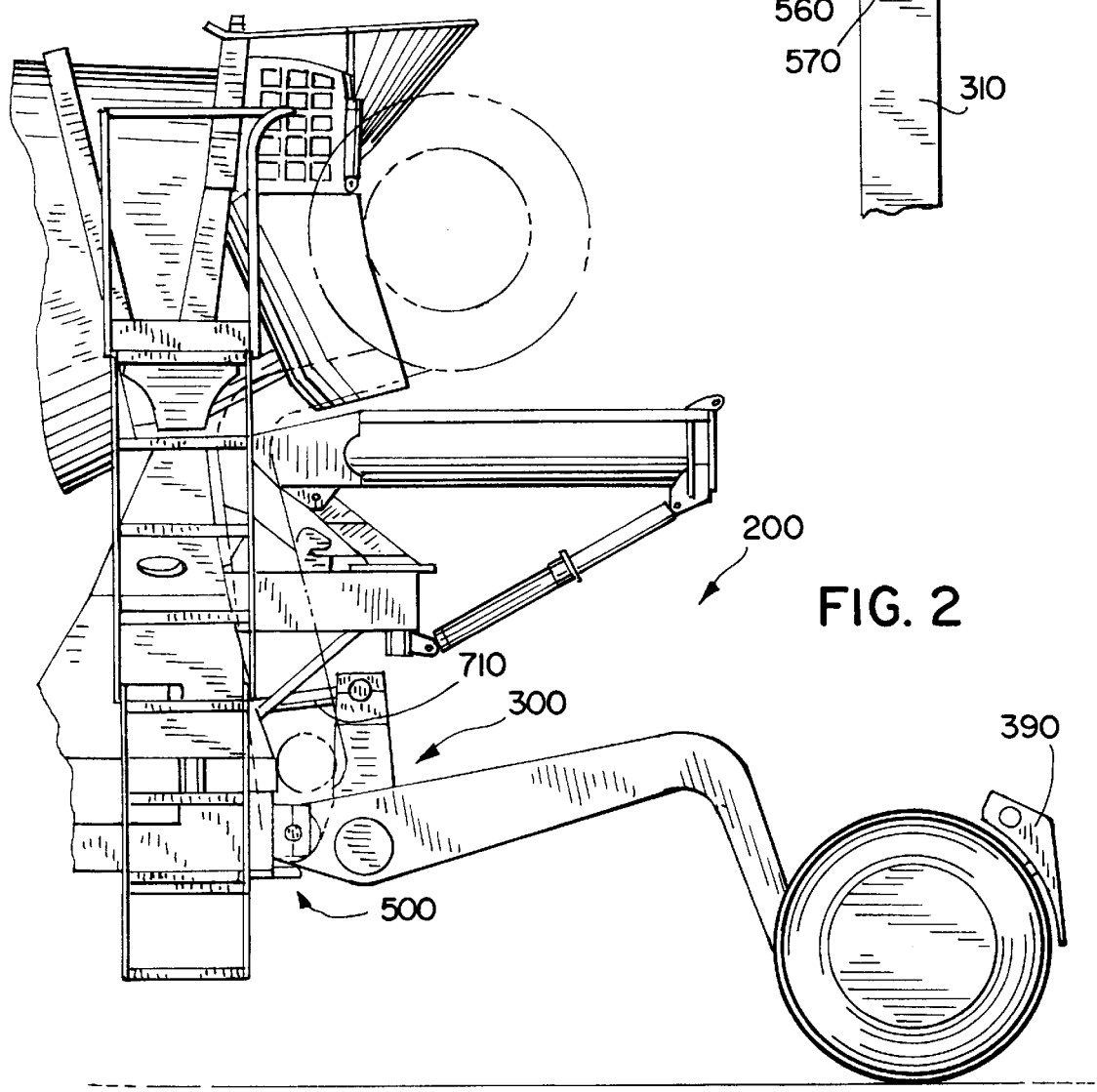

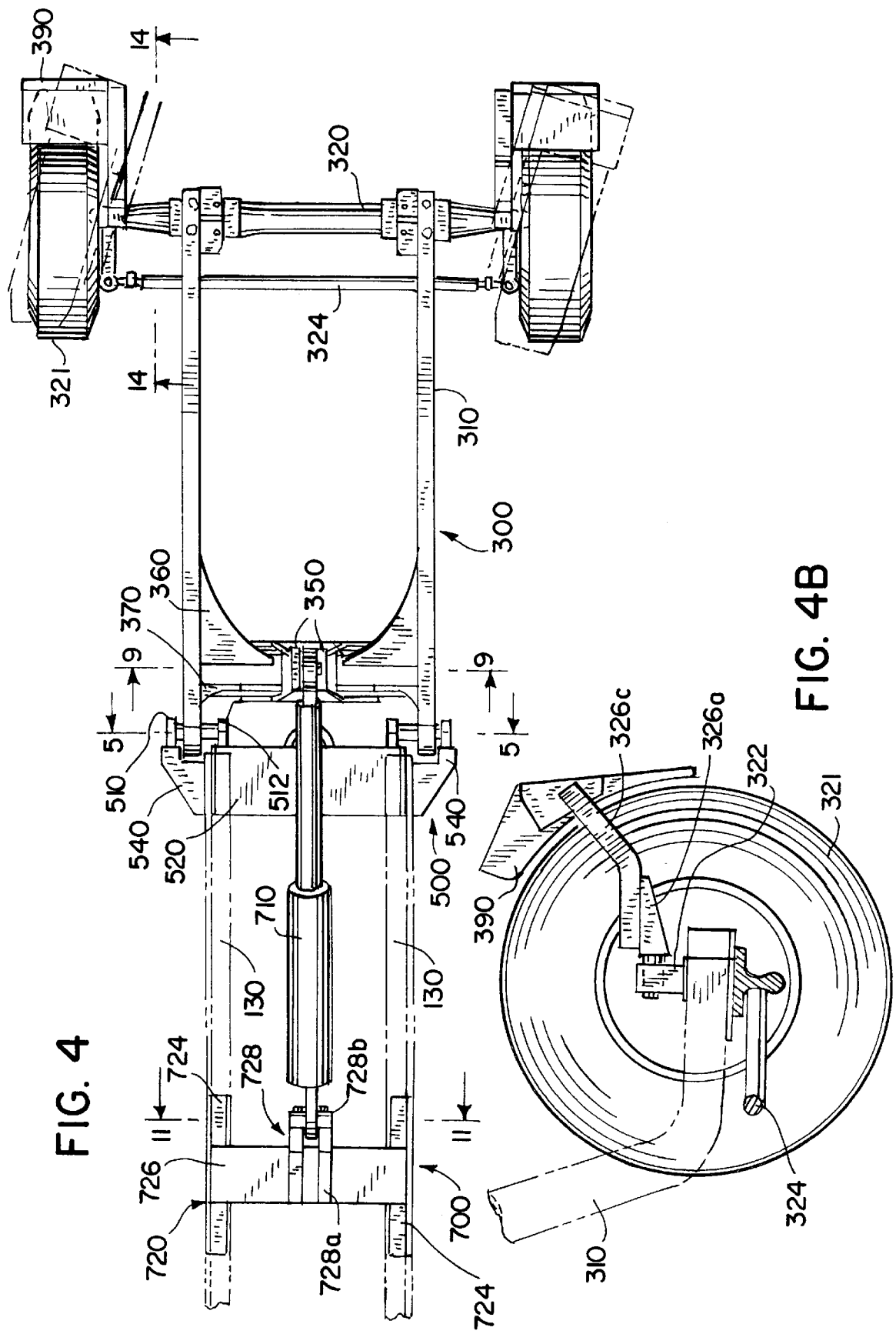

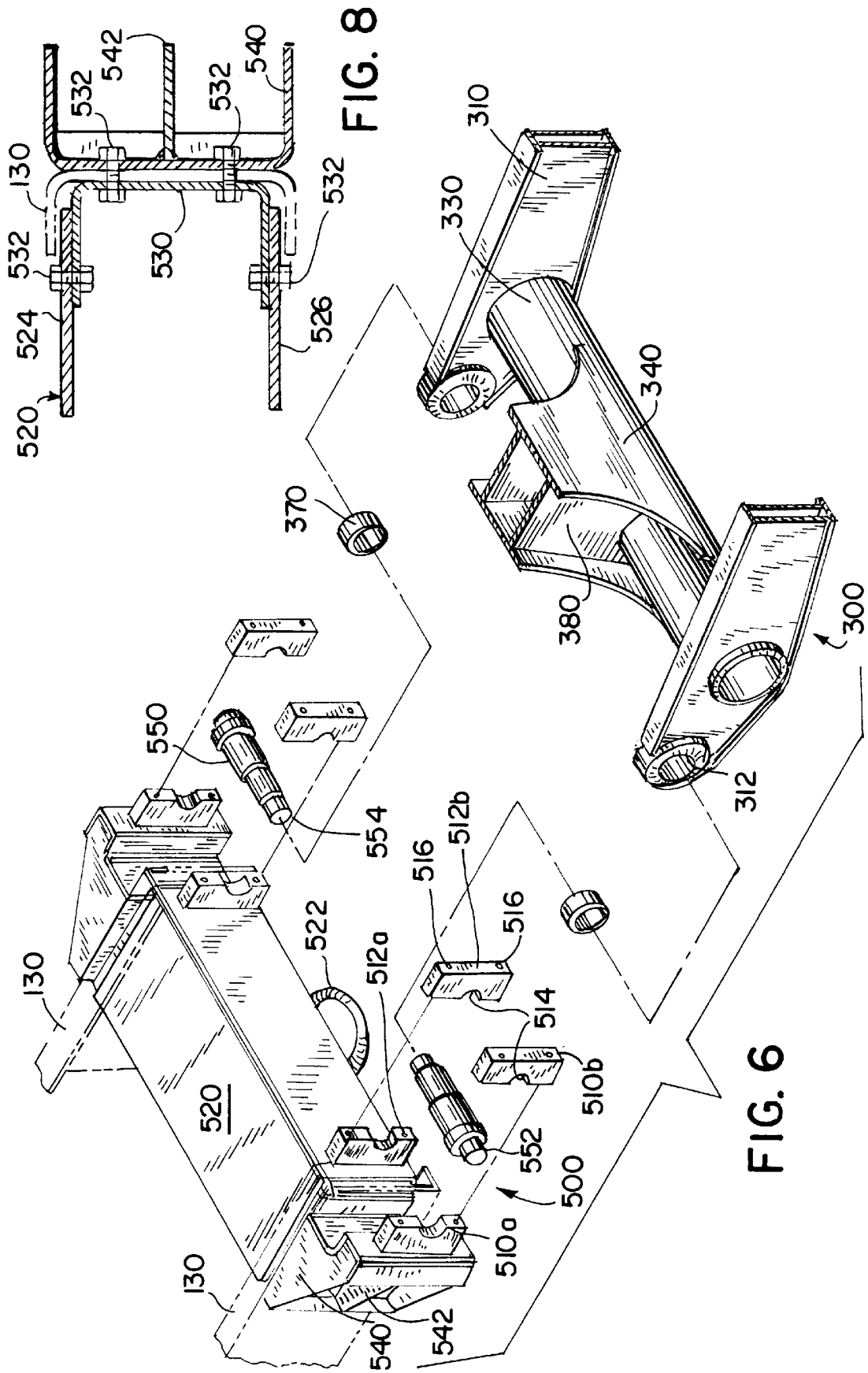

TAG AXLE PIVOT

FIELD OF THE INVENTION

The present invention relates to a tag axle for a load-hauling vehicle. The present invention particularly relates to a tag axle that can be selectively deployed in a ground-engaging, load-supporting position or in a retracted, stowed position. The present invention more particularly relates to a pivoting mechanism for a tag axle for a rear cement mixer truck.

BACKGROUND OF THE INVENTION

Work vehicles are known to carry heavy loads, and often to carry these loads over unpaved surfaces such as dirt roads and around construction sites. In particular, cement trucks carry large drums full of cement long distances and often must traverse unpaved surfaces to access the site for unloading the cement from the drum. Cement trucks typically include a cab for the operator and a rotatable drum behind the cab for containing and mixing concrete. Such cement trucks further typically include a set of front wheels for steering, and plural rear drive axles carrying dual wheel arrangements mounted on a continuous elongate chassis for load-support. For additional load-support, particularly in-transit when the drum is substantially full, a cement truck can benefit by having a pivotally mounted tag axle (auxiliary axle) system able to operate between a raised position in which it is carried by the truck, and a lowered/deployed position in which the tag axle and its wheels share the truck's load.

Not only does the tag axle system assist in balancing the load carried by the cement truck when the drum is fully loaded, it may enable the cement truck to carry a higher total payload than would otherwise be permitted, because weight restrictions placed on vehicles traveling over highways are typically measured in terms of load per axle in combination with overall spacing between axles of a vehicle. By deploying a tag axle system, the number of axles as well as the spacing thereof can be temporarily increased when the truck is heavily loaded, thereby enabling the truck to transport a higher total legal payload.

It is known to have tag axle systems generally consisting of a rear tubular cross member welded to the truck frame, and two tag axle arms pivotally mounted to and extending rearwardly from the tubular cross member. According to a known arrangement, pins are inserted into the ends of the cross member and through apertures in the arms to hold the tag axle arms in place on the cross member with the aid of a set screw. Bearings surround the pin to allow smooth pivoting of the arms. This design is problematic in that over a period of a few years, the bearings may fail and seize to the pin, and the pin may seize to the ends of the cross member. Since cement trucks are often washed with an acid/water solution to remove cement particles from the truck surface, the acid/water solution may come into contact with the tag axle system components and accelerate corrosion of the components, thereby accelerating seizure of those components. Additionally, since load-hauling vehicles are often driven over unpaved surfaces, movement and twisting of the tag axle system components may occur and cause cross member flexure and articulation of the components. As a result of use, and seizing and articulation of the components, over time it becomes more difficult to disassemble and maintain the system, except by cutting the failed components from the frame (typically with a torch) and replacing them. Such permanently mounted components may limit the use of the vehicle (as the frame is itself modified).

Accordingly, it would be advantageous to provide a tag axle system which is relatively simple and inexpensive to produce, and which allows simplified disassembly of the tag axle system for maintenance such as replacement of corroded, seized components of the system.

SUMMARY OF THE INVENTION

According to one aspect of the present invention, there is provided a work vehicle having a frame and an auxiliary axle system having an arm assembly including a pair of arms, an elongate tube extending between the arms and having an end attached to each of the arms, a pair of levers attached to the tube, and cylinder blocks extending between the levers; a cylinder assembly including a first cylinder shaft extending between the cylinder blocks and having an end attached to each of the cylinder blocks, a cylinder cross member attached to the frame, a second cylinder shaft attached to the cylinder cross member, and a hydraulic cylinder having one end attached to the first cylinder shaft and another end attached to the second cylinder shaft; and a rear assembly including a rear cross member attached to the frame, a pair of pivot blocks attached to the rear cross member, and a pivot shaft extending between each pair of pivot blocks and having an end attached to each of the pivot blocks. The arm assembly is pivotally mounted to the rear assembly and is actuated by the cylinder assembly.

According to another aspect of the present invention, there is provided an auxiliary axle system having an arm assembly including a pair of arms, an elongate tube extending between the arms and having an end attached to each of the arms, a pair of levers attached to the tube, and cylinder blocks extending between the levers; a cylinder assembly including a first cylinder shaft extending between the cylinder blocks and having an end attached to each of the cylinder blocks, a cylinder cross member attached to a frame member, a second cylinder shaft attached to the cylinder cross member, and a hydraulic cylinder having one end attached to the first cylinder shaft and another end attached to the second cylinder shaft; and a rear assembly including a rear cross member attached to the frame member, a pair of pivot blocks attached to the rear cross member, and a pivot shaft extending between each pair of pivot blocks and having an end attached to each of the pivot blocks. The arm assembly is pivotally mounted to the rear assembly and is actuated by the cylinder assembly.

According to a further aspect of the present invention, there is provided a pivot mount mechanism for a vehicle having a frame. The pivot mount mechanism includes a pivot shaft mounted to the frame by a mounting assembly including a pair of pivot blocks attached to the frame, the pivot blocks having apertures into which ends of a pivot shaft are received.

Other advantages of the invention will become apparent from the detailed description given hereinafter. It should be understood, however, that the detailed description and specific embodiments are given by way of illustration only. Based on the following description, various changes and modifications within the spirit and scope of the invention will become readily apparent to those skilled in the art.

BRIEF DESCRIPTION OF THE DRAWINGS

The preferred exemplary embodiment of the invention will hereinafter be described in conjunction with the appended FIGURES, in which like reference numerals denote like elements.

FIG. 1 shows a side view of a work vehicle having an auxiliary axle according to the present invention.

FIG. 2 shows a close-up of a rear part of the work vehicle including the auxiliary axle assembly according to the present invention.

FIG. 3 shows a side view of the auxiliary tag axle of the present invention.

FIG. 4 is a view taken along line 4—4 of FIG. 1.

FIGS. 4B and 4C are a side view of the auxiliary tag axle showing the tie rod and fender attachment.

FIG. 6 is an exploded perspective view of a rear assembly of the present invention.

FIG. 7 is a view taken along line 7—7 of FIG. 5.

FIG. 8 is a view taken along line 8—8 of FIG. 7.

DETAILED DESCRIPTION OF THE PREFERRED EMBODIMENT

Figure 3A:
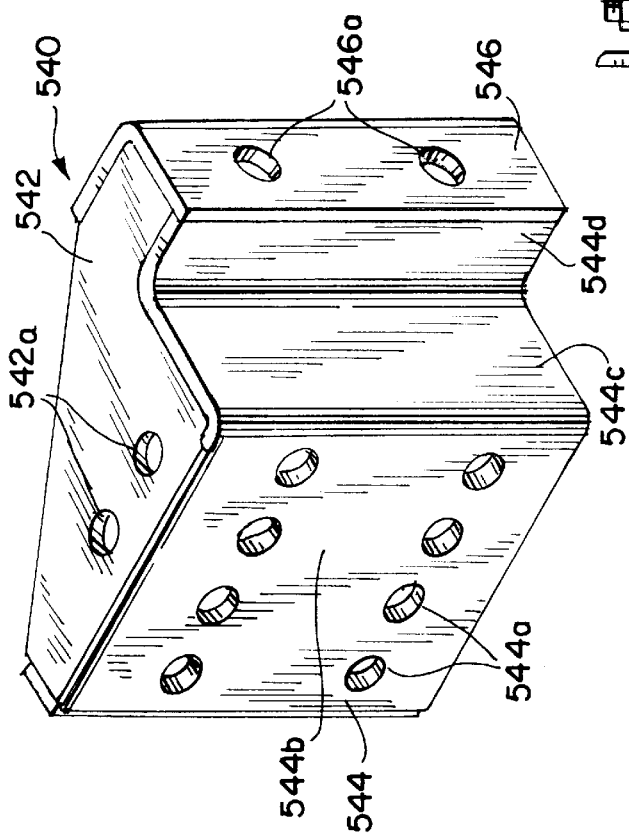
FIG. 3A is a perspective view of the pivot block brackets of the auxiliary tag axle of the present invention.

FIG. 1 shows a work vehicle 100, particularly a cement mixing truck, having a cab 110 for the operator of the work vehicle, and a drum 120 behind cab 110. Drum 120 mixes and stores the cement. Work vehicle 100 further includes a chassis or frame, including two parallel chassis members 130 which extend along a length of work vehicle 100. Below cab 110 is a front steering axle 140 for steering work vehicle 100. Below drum 120 are two rear, load bearing axles 150. Behind rear axles 150 is a pivotally mounted auxiliary axle assembly 200. Auxiliary axle assembly 200 includes, as can be seen in FIGS. 1 though 3, an arm assembly 300, a rear assembly 500, and an actuator assembly 700. Arm assembly 300 includes rearwardly extending arms 310, between which an auxiliary axle 320 is mounted at a rearmost end of arms 310. Arms 310 are substantially parallel. The other (frontmost) end of arms 310 is pivotally mounted to chassis members 130 by rear assembly 500, including pivot blocks (clamp blocks) 510.

A pivot shaft 550 is fixedly mounted (e.g., by brackets as shown, or alternatively by welding, bolts, or pins) to pivot blocks 510. Each arm 310 is pivotally mounted on pivot shaft 550. A tube 330 extends between arm 310 of arm assembly 300. Levers 340 extend upward from tube 330. Cylinder blocks (clamp blocks) 350 are fixedly mounted together (e.g., by bolts as shown, or other fasteners or attachment according to alternative embodiments) to levers 340. A first cylinder shaft 360 is fixedly mounted (e.g., by clamp blocks, as shown, by bolted brackets, by welding or by pins according to alternative embodiments) to cylinder blocks 350, and engages an actuator 710 of actuator assembly 700. In a preferred embodiment, actuator 710 is a hydraulic cylinder, and has a rating of 3000 psi. In a preferred embodiment, arms 310 and levers 340 are formed from a T1 material which conforms to ASTM A514-97, grade B. In a preferred embodiment, pivot blocks 510 and cylinder blocks 350 preferably comprise a low carbon steel, and tube 330 includes a Schedule 80 pipe. Pivot shaft 550 and first cylinder shaft 360 preferably comprise SAE 1045 hot rolled bar, which is heat-treated, quenched and tempered to have a minimum hardness to 35–40 RC minimum.

FIG. 2 shows a close-up of a rear portion of work vehicle 100. Auxiliary axle assembly 200 is shown in a deployed position and a stowed position (in phantom). Actuator 710 actuates auxiliary axle assembly 200 between a deployed (substantially horizontal) position wherein auxiliary axle assembly 200 shares the load of work vehicle 100 with load bearing axles 150, and a stowed (substantially vertical) position wherein auxiliary axle assembly 200 is secured to the rear of work vehicle 100. Auxiliary axle assembly 200 includes a fender 390 (typically with mud flap). (The length of the vehicle is important, in such applications, and the mounting arrangement of the fender advantageously allows the wheel and fender to be kept in close relationship, as each turn with one another.) FIG. 3 illustrates a side view of auxiliary axle assembly 200. Chassis member 130 of work vehicle 100 is shown in phantom to illustrate how auxiliary axle assembly 200 mounts to chassis members 130. Cylinder cross member 720 is fixedly mounted (e.g., by bolts as shown or welding according to alternative embodiments) to chassis members 130 in an area of rear axles 150. Cylinder cross member 720 preferably includes steel and is described further in reference to FIGS. 11 and 12. Cylinder crossblocks 728 of cylinder cross member 720 extend upward. A second cylinder shaft 730 is fixedly mounted (e.g., by bolted brackets as shown or by welding or pins according to alternative embodiments) to cylinder crossblocks 728 and actuator 710 is pivotally mounted (e.g., by a bearing as shown or by a collar or ring according to alternative embodiments) to second cylinder shaft 730. Second cylinder shaft 730 is preferably made of a tempered, heat-treated carbon steel. Actuator 710 extends rearwardly such that actuator 710 engages first cylinder shaft 360. First cylinder shaft 360 is fixedly mounted (e.g., by cylinder blocks as shown, by bolted brackets, by welding, or by pins according to alternative embodiments) to cylinder blocks 350 that are mounted to levers 340 (e.g., by welding as shown or by bolts according to alternative embodiments) extending upwardly from tube 330. A rear cross member (not visible in FIG. 3 except for a towing eye 522, but shown in FIGS. 4 through 7) is fixedly mounted (e.g., by welding as shown by bolts, brackets, or by pins according to alternative embodiments) to a rear portion of chassis members 130 using chassis end brackets 530 (shown in FIG. 5) on an inside of chassis members 130 and pivot block brackets 540 on an outside of chassis members 130.

FIG. 3A illustrates a pivot block bracket 540. Pivot block bracket 540 includes a tapered gusset 542 interconnected (e.g., by welding) with a chassis block bracket 544. Chassis block bracket 544 includes a tapered gusset 542 with an interconnected (e.g., by welding) angle bracket 546. Chassis block bracket is preferably designed as a plate having two approximately 90° (right-angle) bends. Therefore, chassis block bracket 544 has three separate faces, defined by the two bends, a chassis face 544b, a front face 544c, and an extension face 544d. Tapered gusset 542, chassis block bracket 544, and angle bracket 546 preferably have bolt apertures indicated by reference numerals 542a, 544a, and 546a, respectively, as shown. Pivot blocks 510 are fixedly mounted (e.g., by bolts, as shown or by welding or by pins according to alternative embodiments) to rear cross member 520 on each side of work vehicle 100, and extend rearwardly. Pivot shafts 520 extend between pivot blocks 510. Arms 310 are pivotally mounted to pivot shafts 550. Pivot block brackets 540 and chassis end brackets 530 preferably comprise steel.

FIG. 4 shows a view of chassis members 130 of work vehicle 100, and auxiliary axle assembly 200 taken along line 4—4 in FIG. 1. As can be seen, chassis members 130 extend in parallel. Cylinder cross member 720 includes side members 724. Each side member 724 is fixedly mounted (e.g., by bolts, as shown or welding according to alternative embodiments) to a chassis member 130. A tube 726 extends across side members 724 and is fixedly mounted (e.g., by welding as shown or by bolts according to alternative embodiments) to side members 724. Cross member blocks 728 extend outwardly from tube 726, and have a sloped portion 728a and a rectangular portion 728b. Second cylinder shaft 730 is fixedly mounted (e.g., by bolts as shown or by welding according to alternative embodiments) to rectangular portions 728b of cross member blocks 728, and actuator 710 is pivotally mounted to second cylinder shaft 730. Actuator 710 extends rearwardly to engage first cylinder shaft 360 which is fixedly mounted to cylinder blocks 350 (according to alternative embodiments mounting may be carried out by welding, by bolts, or by pins). Cylinder blocks 350 are mounted (e.g., by bolts as shown or welding according to alternative embodiments) to levers 340, which extend from tube 330. Tube 330 is fixedly mounted (e.g., by welding as shown or by bolts, by brackets, or by pins according to alternative embodiments) to rearwardly extending arms 310. Gussets 360 and 370 are used to reinforce auxiliary axle assembly 200. Gussets 360 and 370 are shown to be substantially triangular and extend between tube 330 and arms 310. In a preferred embodiment, gussets 360 and 370 comprise the same T1 steel as arms 310 and levers 340, and rear cross member 520 and chassis end brackets 530 comprise X1050 carbon steel ASTM A572-1, grade 50. Preferably, tow eye 522 is welded to rear cross member 520 and is formed of carbon steel ASTM A108-93. In a preferred embodiment, pivot block brackets 540 are formed of carbon steel ASTM A656-93, grade 80. Preferably, side members 724 comprise the same T1 material as arms 310, tube 726 is formed of mechanical tubing, and cylinder crossblocks 728 comprise 1025 SAE carbon steel.

Arms 310 are pivotally mounted to the rear of the chassis using rear assembly 500, including rear cross member 520 mounted (e.g., by bolts as shown or welding according to alternative embodiments) to the inside of chassis members 130, and pivot block brackets 540 fixedly mounted (e.g., by bolts as shown or welding according to alternative embodiments) to the outside of chassis members 130. Outer pivot blocks 510 are fixedly mounted (e.g., by bolts as shown or welding according to alternative embodiments) to pivot block brackets 540. Inner pivot blocks 512 are fixedly mounted (e.g., by bolts as shown or welding according to alternative embodiments) to rear cross member 520. Pivot shafts 550 are mounted (e.g., by the clamping effect of the pivot blocks as shown or by welding, by bolts, or by pins according to alternative embodiments) between outer pivot blocks 510 and adjacent inner pivot blocks 512. Arms 310 are pivotally mounted (e.g., by bolts as shown or welding according to alternative embodiments) to pivot shafts 550.

Figure 4A:
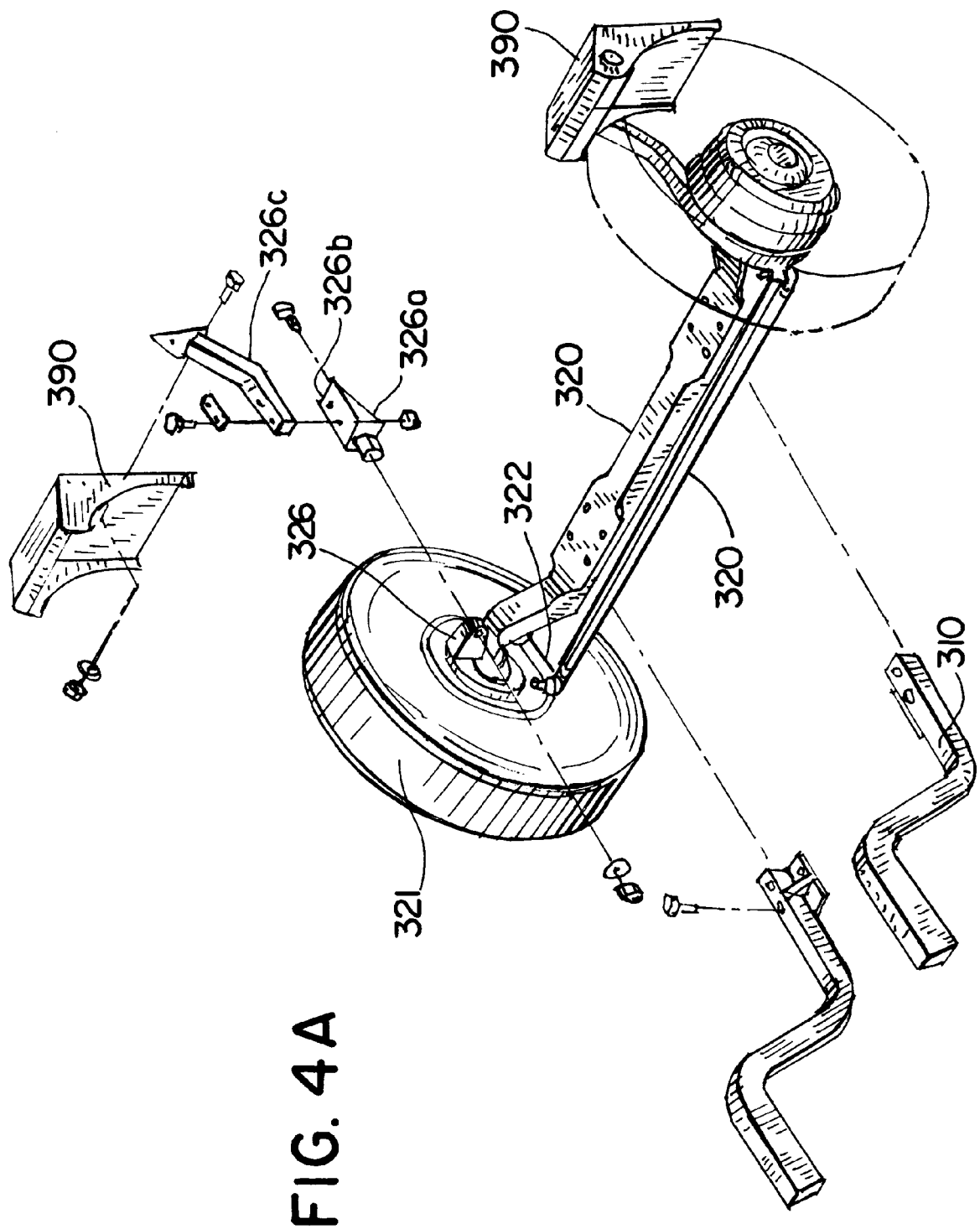
FIG. 4A is an exploded perspective view of the auxiliary tag axle showing the fender attachment.

FIG. 4A illustrates the attachment of fenders 390 to auxiliary axle assembly 200 (e.g., in a wheel bearing or the like). Wheels 321 of auxiliary axle assembly are freely rotatable and pivotable (within a defined range of motion, as shown in FIG. 4 in phantom lines) about a wheel pivot 322. Each wheel 321 is pivotably coupled to the opposed ends of an axle member 320 by wheel pivot 322. (Axle member 320 includes a mounting area at which arms 310 can be coupled thereto by fasteners (shown as throughgoing bolts in FIG. 4A)). A connecting rod 324 interconnects wheels 321 (as shown, through a link coupled to wheel pivot 322), and constrains the wheels to pivot (e.g., "steer") in unison. (This configuration tends to reduce tire wear from "wheel scrub" or dragging of the wheels along the ground by promoting appropriate pivotal response of the wheels in a turn.) A fender pivot 326 is preferably interconnected with wheel pivot 322 such that fender pivot 326 also turns in unison with wheels 321 (as shown in FIG. 4B). Fender pivot 326 is interconnected with a fender mount 326a, preferably using bolts, as shown. Fender mount 326a preferably has bolt apertures 326b for mounting a fender bracket 326c that is attached to fender 390, preferably using bolts, as shown. The interconnection of fender pivot 326, fender mount 326a, fender bracket 326c, and fender 390 causes fender 390 to turn in unison with wheels 321. (Fender 390 may also be rotatable about the mounting point to fender bracket 326c.)

Figure 5:
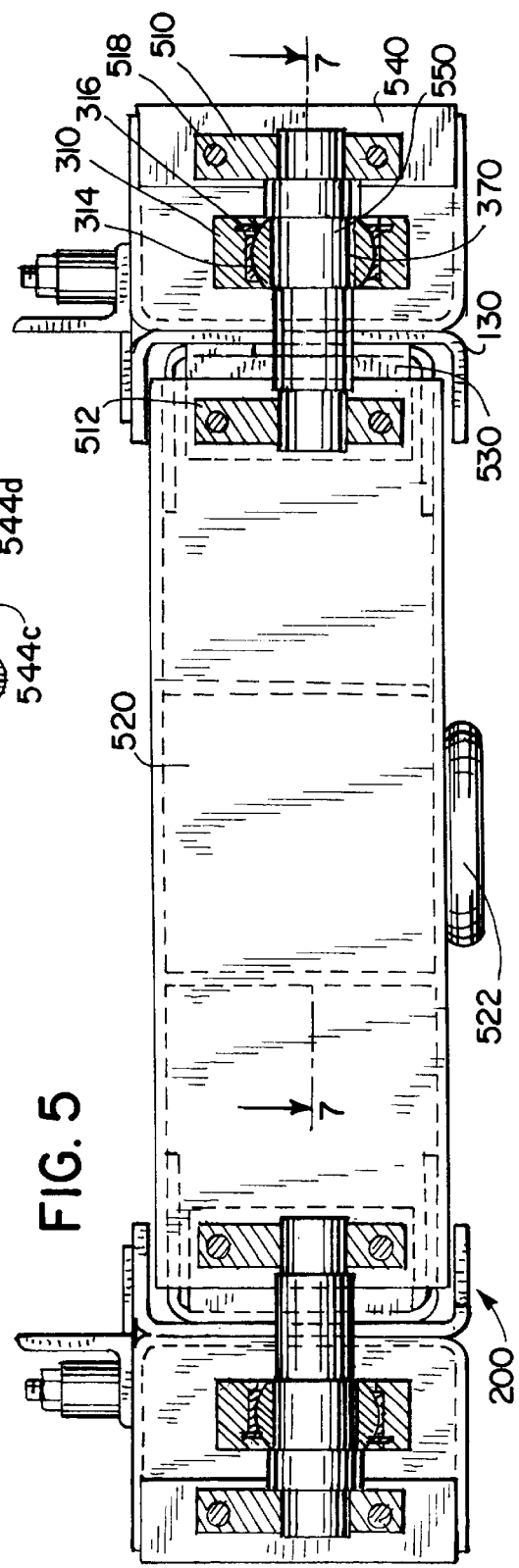
FIG. 5 is a view taken along line 5—5 of FIG. 4.

FIG. 5 is a cross-sectional view of auxiliary axle assembly 200, taken along lines 5—5 of FIG. 4. As can be seen, pivot block brackets 540 are mounted (e.g., by bolts as shown or welding according to alternative embodiments) to the outside of chassis members 130, and chassis end brackets 530 are mounted (e.g., by bolts as shown or welding according to alternative embodiments) to the inside of chassis members 130. Outer pivot blocks 510 are mounted (e.g., by bolts as shown or welding according to alternative embodiments) to pivot block brackets 540, and inner pivot blocks 512 are mounted (e.g., by bolts as shown or welding according to alternative embodiments) to chassis end brackets 530 and to rear cross member 520. Pivot shafts 550 extend between outer pivot blocks 510 and adjacent inner pivot blocks 512. Arms 310 are pivotally mounted to pivot shafts 310 by insertion of pivot shafts 550 into apertures 312 of arms 310. Bearings 370 are also inserted into apertures 312 of arms 310 and surround pivot shafts 550, thereby providing smoother pivoting and reducing wear on the pivoting components.

Each bearing 370 is preferably contained by a shoulder 314 and a snap-ring 316, and preferably has a rubber seal (not shown) on each side of bearing 370. The rubber seals are installed to allow excess oil to escape from bearing 370 and to prevent dust and contaminants from entering bearing 370. In a preferred embodiment, bearing 370 is a spherical bearing having an inner diameter of 2.75 inches and an outer diameter of 4.375 inches. Also in a preferred embodiment, bearing 370 has a radial load limit of 252,000 pounds and a dynamic radial load limit of 81,600 pounds.

FIG. 6 shows rear assembly 500 and a portion of arm assembly 300. Pivot block brackets 540 are mounted (e.g., by bolts as shown or welding according to alternative embodiments) to the outside of chassis members 130, and chassis end brackets 530 (shown in FIG. 5) are mounted (e.g., by bolts as shown or welding according to alternative embodiments) to the inside of chassis members 130. Outer pivot blocks 510 are mounted (e.g., by bolts as shown or welding according to alternative embodiments) to pivot block brackets 540, and inner pivot blocks 512 are mounted (e.g., by bolts as shown or welding according to alternative embodiments) to chassis end brackets 530 and to rear cross member 520. Pivot shafts 550 extend between outer pivot blocks 510 and adjacent inner pivot blocks 512. Arms 310 are pivotally mounted to pivot shafts 550 by insertion of pivot shafts 550 into apertures 312 of arms 310. Bearings 370 are also inserted into apertures 312 of arms 310 and surround pivot shafts 550. Each outer pivot block 510 is formed of two halves 510a and 510b, and each inner pivot block 512 is formed of two halves 512a and 512b. Each block half preferably has a semi-circular groove 514 and two bolt holes 516. Upon placing halves 510a and 510b together to form pivot block 510, grooves 514 of each half 510a and 510b are aligned to form a circular aperture through which pivot shaft 550 is inserted. Bolt holes 516 of the halves 510a and 510b are aligned to form continuous bolt holes aligned with holes (not shown) in pivot block bracket 540 or rear cross member 520 and chassis end bracket 530. Outer pivot blocks 510 are fixedly mounted to pivot block brackets 540 using bolts 518 (see FIG. 5) inserted through bolt holes 516 of outer pivot blocks 510 and through aligned holes in pivot block brackets 540. (Bolts used in the present invention may preferably be ¾-inch Grade 8 bolts.) Inner pivot blocks 512 are fixedly mounted to chassis end brackets 530 and to rear cross member 520 using bolts 518 (see FIG. 5) inserted through bolt holes 516 of inner pivot blocks 512 and through aligned holes (not shown) in chassis end brackets 530 and rear cross member 520.

During manufacturing of pivot blocks 510 and 512, a shim (not shown) is inserted between the pivot block halves, and the pivot block halves are pressed together with the shim between them and the aperture is machined. After the aperture is machined the shim is removed. This technique allows improved interference fit of the pivot shaft into the pivot blocks.

Before assembling pivot block halves 510a and 510b, bearings 370 are placed over a central portion of pivot shafts 550, and arm apertures 312 are placed over bearings 370. Pivot shaft 550 is then placed between pivot block halves 510a and 510b and pivot block halves 510a and 510b are assembled and tightened to retain pivot shaft 550. Outer pivot blocks 510 retain outer ends 552 of pivot shaft 550, and inner pivot blocks 512 retain inner ends 554 of pivot shafts 550. Retention of pivot shafts 550 retains arms 310 mounted to pivot shafts 550.

As can be seen in FIG. 7, a cross-sectional view taken along lines 7—7 of FIG. 5, pivot block bracket 540 is mounted (e.g., by bolts as shown or welding according to alternative embodiments) to the outside of chassis member 130, and chassis end bracket 530 is mounted (e.g., by bolts as shown or welding according to alternative embodiments) to the inside of chassis member 130. Outer pivot block 510 is mounted (e.g., by bolts as shown or welding according to alternative embodiments) to pivot block bracket 540, and inner pivot block 512 is mounted (e.g., by bolts as shown or welding according to alternative embodiments) to chassis end bracket 530 and to rear cross member 520. Pivot shaft 550 extends between outer pivot block 510 and inner pivot block 512. Arm 310 is pivotally mounted to pivot shaft 550. Bearing 570 surrounds pivot shaft 550 and is positioned between pivot shaft 550 and arm 310.

FIG. 8 is a cross-sectional view taken along lines 8—8 of FIG. 7, and illustrates the interconnection of rear cross member 520, chassis end bracket 530, and pivot block bracket 540 with chassis member 130 (shown in phantom). As can be seen, chassis end bracket 530 has a "U"-shaped cross-section that is situated within the "U"-shaped cross-section of chassis member 130. Pivot block bracket 540 is mounted (e.g., by bolts as shown or welding according to alternative embodiments) to chassis member 130 on an opposite side from chassis end bracket 530. Preferably, chassis end bracket 530 and pivot block bracket 540 are mounted to chassis member 130 with bolts 532 extending through aligned holes in chassis member 130, chassis end bracket 530 and pivot block bracket 540. A top side 524 and a bottom side 526 of rear cross member 520 are mounted to chassis end bracket 530, preferably using bolts 532. Bolts 532 are preferably ¾ inch. As can be seen in FIG. 8, pivot block brackets 540 include a tapered gusset 542 extending along a length of pivot block bracket 540.

Figure 9:
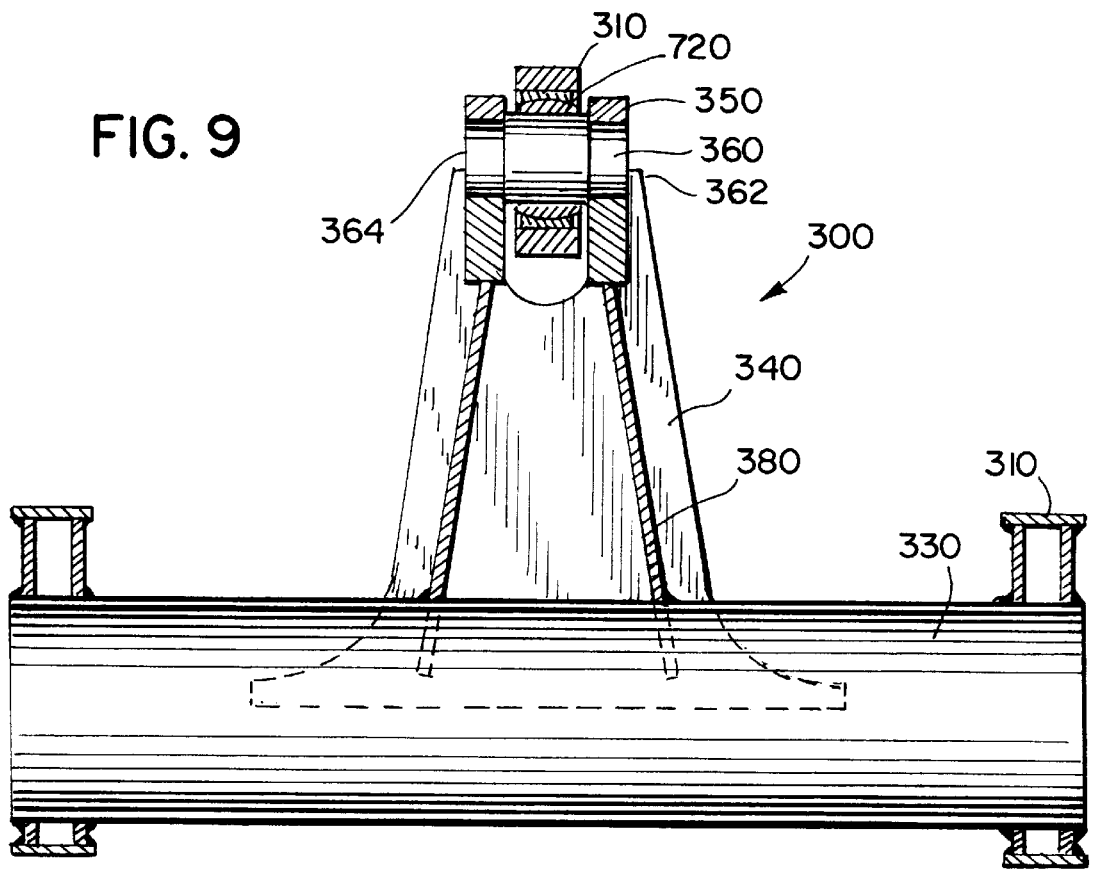
FIG. 9 is a view taken along line 9—9 of FIG. 4.

FIG. 9 shows a cross-sectional view taken along lines 9—9 of FIG. 4. Arm assembly 300 includes arms 310 and tube 330 mounted to arms 310 and extending between arms 310. Levers 340 extend from tube 330 in an upward direction. Side supports 380 extend between levers 340 to reinforce levers 340. Cylinder blocks 350 also extend between levers 340. First cylinder shaft 360 is mounted to cylinder blocks 350 such that ends 362 and 364 of first cylinder shaft 362 extend through apertures of cylinder pivot blocks 350. Actuator 710 is pivotally mounted to first cylinder shaft 360 and surrounds first cylinder shaft 360. A bearing 720 is situated between first cylinder shaft 360 and actuator 710 to allow smooth rotation of actuator 710 around first cylinder shaft 360 and to reduce wear of the components. Bearing 720 is preferably sealed and is preferably integral with actuator 710.

Figure 10:
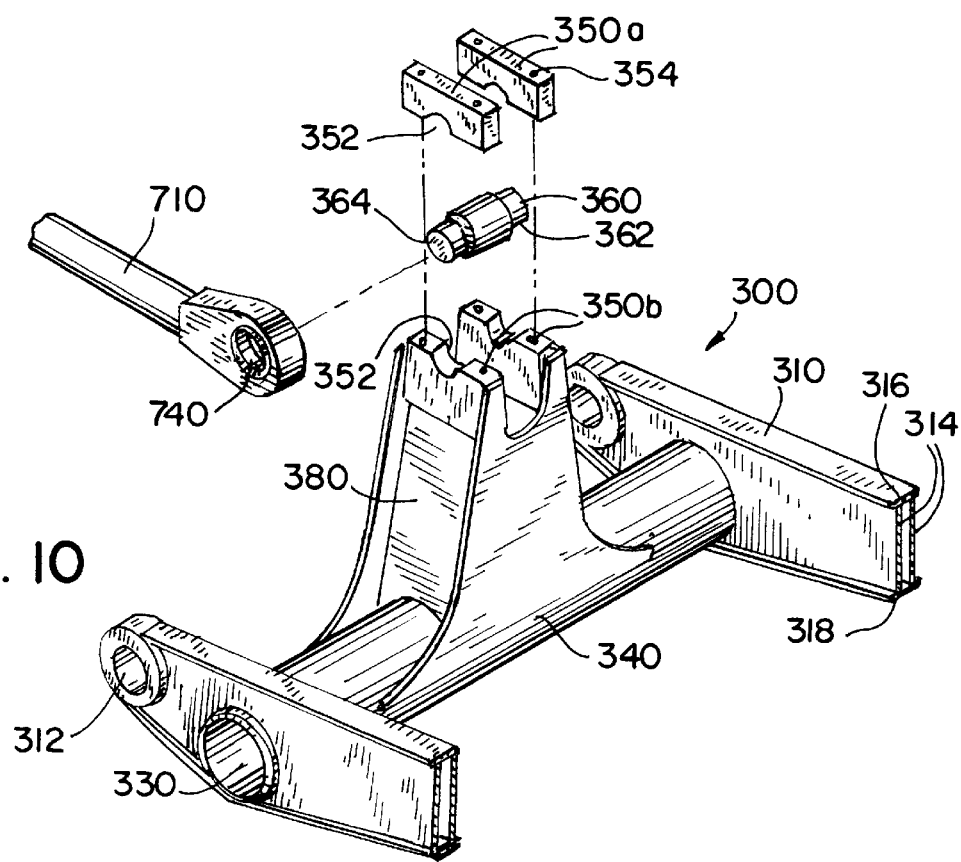
FIG. 10 is an exploded perspective view an arm assembly of the present invention.

FIG. 10 shows arm assembly 300, which includes tube 330 mounted (e.g., by welding as shown or by bolts, clamp blocks, or pins according to alternative embodiments) to arms 310 and extending between arms 310. Levers 340 extend from tube 330 in an upward direction. Side supports 380 extend between levers 340. Cylinder blocks 350 also extend between levers 340. Each cylinder block 350 is formed of two cylinder block halves 350a and 350b. Each cylinder block half 350a and 350b preferably has a semicircular groove 352 and two bolt holes 354. Upon placing halves 350a and 350b together to form cylinder block 350, grooves 352 of each cylinder block half 350a and 350b are aligned to form a circular aperture through which first cylinder shaft 360 is inserted. First cylinder shaft 360 is clamped between cylinder blocks 350 such that ends 362 and 364 of first cylinder shaft 360 extend through the apertures of cylinder pivot blocks 350. Actuator 710 is mounted to first cylinder shaft 360 and surrounds cylinder shaft 360. Bearing 720 is situated between first cylinder shaft 360 and actuator 710 to allow smooth rotation of actuator 710 around first cylinder shaft 360, and to reduce wear of the components. Bearing 720 is preferably sealed and is preferably integral with actuator 710.

During manufacturing of cylinder blocks 350, a shim (not shown) is inserted between the cylinder block halves, and the cylinder block halves are pressed together with the shim between them and the aperture is machined. After the aperture is machined the shim is removed. This technique allows improved interference fit of the first cylinder shaft into the cylinder blocks.

It is known in the art to have arms with an I-beam cross section. The present invention provides, as can be seen in FIG. 10, arms 310 having a box cross-section and including two side walls 314, a top wall 316 and a bottom wall 318. Having two side walls 314 provides substantially greater strength of auxiliary axle assembly 200, particularly during side loading and twisting of the chassis/axle assembly. Twisting occurs, for example, when the work vehicle is driven over unpaved roads. In a preferred embodiment, side walls 314, top wall 316 and bottom wall 318 have a thickness of ¼ inch, and are made from a high grade carbon steel such as T1, but side walls 314 may be formed of a lower grade carbon steel than T1.

Figure 11:
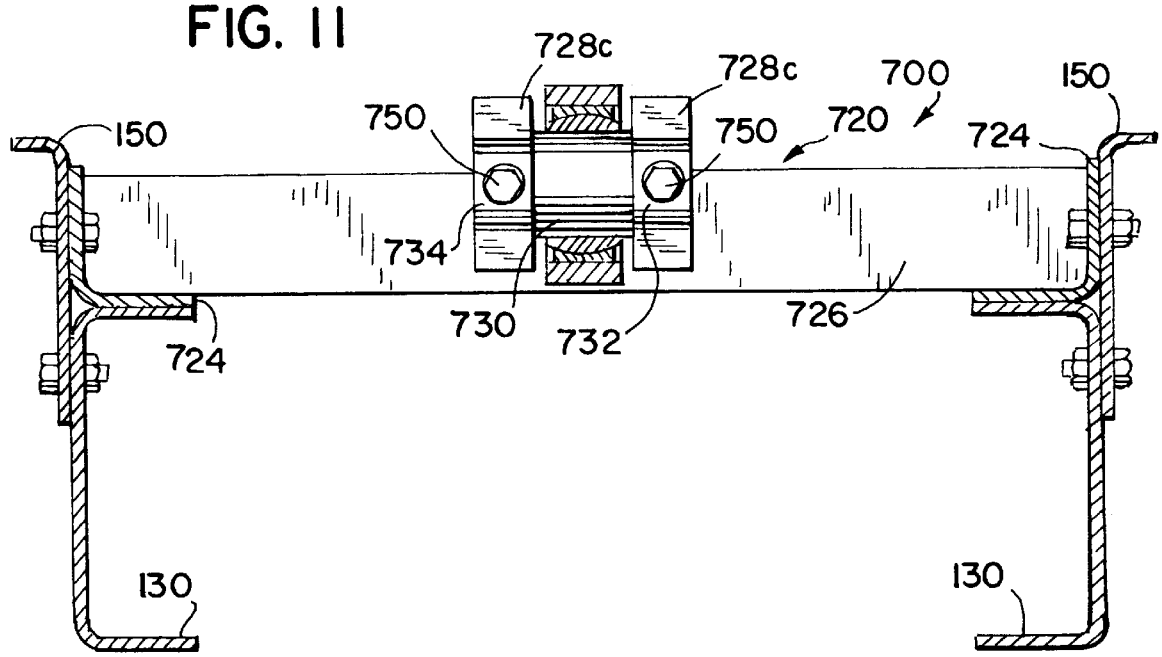
FIG. 11 is a view taken along line 11—11 of FIG. 4.

FIG. 11 shows a cross-sectional view taken along lines 11—11 of FIG. 4. As can be seen, cylinder cross member 720 has "L"-shaped side members 724 mounted (e.g., preferably using huck bolt reinforcements, or other bolts or fasteners according to alternative embodiments) to chassis members 130. Tube 726 extends between "L"-shaped side members 724 and is fixedly mounted, preferably by welding, thereto. Cylinder crossblocks 728 extend from tube 726. Ends 732 and 734 of second cylinder shaft 730 are mounted to cylinder crossblocks 728, preferably using bolts 750 (preferably 7/8 inch bolts). Actuator 710 is mounted to second cylinder shaft 730 and surrounds a central portion of second cylinder shaft 730. A bearing 740 is disposed between second cylinder shaft 730 and actuator 710, upon assembly of the components, to provide smooth pivoting and reduce wear on the pivoting components. A frame reinforcement angle 150 is mounted (e.g., by bolts as shown or welding according to alternative embodiments) to each of chassis members 130 and side members 724 to provide structural reinforcement. Reinforcement angle 150 is preferably formed from a T1 material which conforms to ASTM A514-97, grade B or other suitable material.

Figure 12:
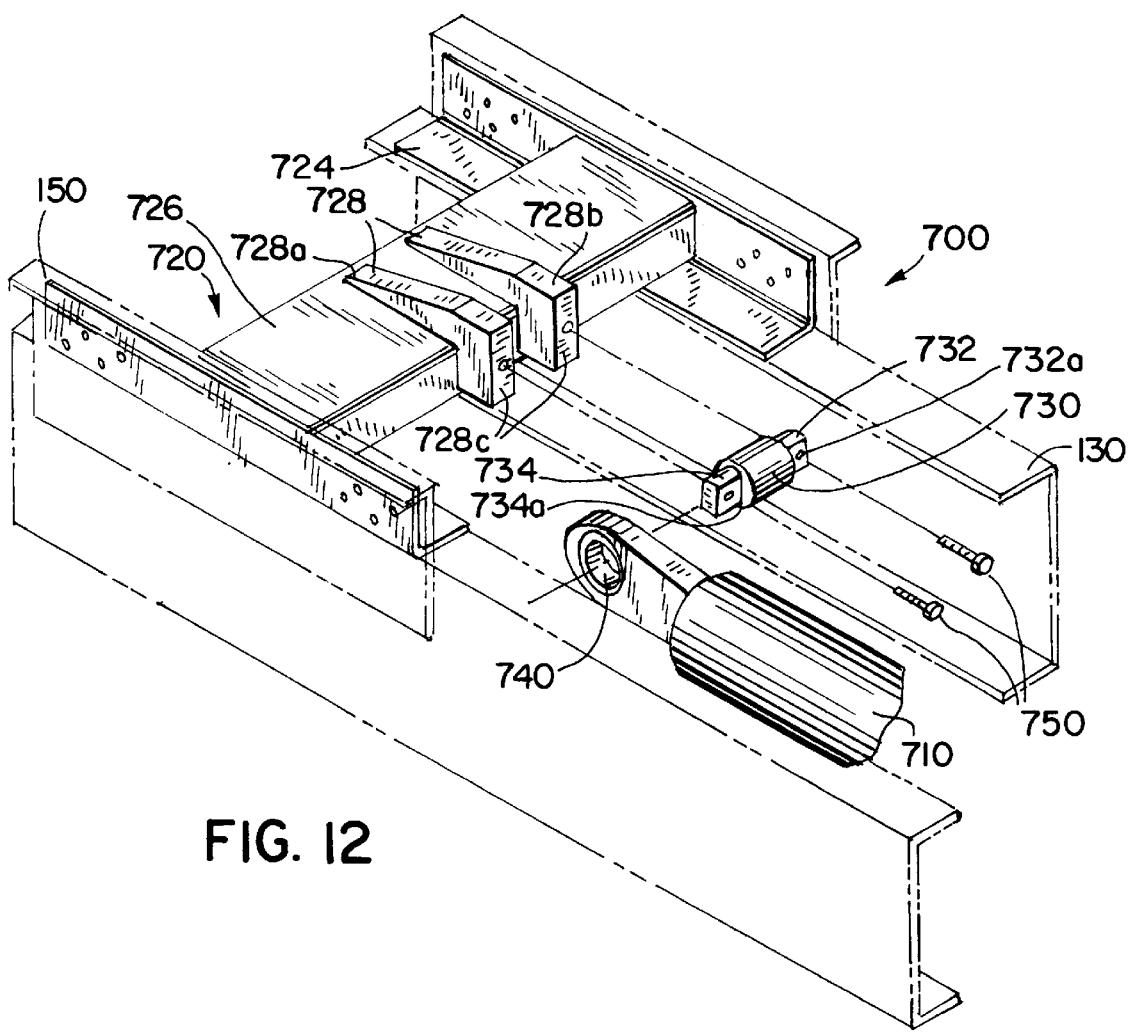
FIG. 12 is an exploded perspective view of a hydraulic cylinder assembly of the present invention.

FIG. 12 shows actuator assembly 700, which includes cylinder cross member 720 having "L"-shaped side members 724 mounted to chassis members 130 (shown in phantom). Tube 726 extends between "L"-shaped side members 724 and is fixedly mounted thereto. Cylinder crossblocks 728 extend upwardly from tube 726. Ends 732 and 734 of second cylinder shaft 730 are mounted to cylinder crossblocks 728, preferably using bolts 750 (preferably 7/8 inch bolts). Actuator 710 is pivotally mounted to second cylinder shaft 730 and surrounds a central portion of second cylinder shaft 730. Bearing 740 is disposed between second cylinder shaft 730 and actuator 710, upon assembly of the components, to effect the pivotal mounting and thereby to provide smooth pivoting and reduce wear on the pivoting components As can be seen, ends 732 and 734 of second cylinder shaft 730 preferably have machined flats 732a and 732b. Flats 732a and 732b provide improved mounting of second cylinder shaft 730 to cylinder crossblocks 728 because flat surfaces (as opposed to semi-cylindrical surfaces) for second cylinder shaft ends 732 and 734 are preferable to abut flat surfaces 728c of cylinder crossblocks 728. In addition, flat surfaces for second cylinder shaft ends 732 and 734 are preferable to abut the flattened head of bolt 750.

Although the foregoing description has been provided for the presently preferred embodiment of the invention, the invention is not intended to be limited to any particular arrangement, but is defined by the appended claims. For example, arms 310 may have an I-beam cross-section. As will be apparent to one of ordinary skill in go the art who reviews this disclosure, the mounting of various assemblies and elements can be effected by welding or, as indicated preferably by mechanical fasteners (such as bolts) where welding may adversely affect the strength of the elements in a material sense. Alternative configurations of the invention, that may occur to those skilled in the art, are intended to form a part of the invention to the extent such alternatives fall within the scope of the appended claims.

What is claimed is:

1. A work vehicle having a frame and an auxiliary axle assembly comprising:
   an arm assembly including
      a pair of arms,
      an elongate tube extending between the arms and having an end mounted to each of the arms,
      a pair of levers attached to the tube, and
      cylinder blocks extending between the levers;
   a cylinder assembly including
      a first cylinder shaft extending between the cylinder blocks and having an end attached to each of the cylinder blocks,
      a cylinder cross member attached to the frame,
      a second cylinder shaft attached to the cylinder cross member, and
      a hydraulic cylinder having one end attached to the first cylinder shaft and another end attached to the second cylinder shaft;
   a rear assembly including
      a rear cross member attached to the frame,
      a pair of pivot blocks attached to the rear cross member, and
      a pivot shaft extending between the pivot blocks and having an end attached to each of the cylinder blocks;
      wherein the arm assembly is pivotally mounted to the rear assembly and is actuated by the cylinder assembly.

2. The vehicle of claim 1, wherein each cylinder block includes first and second halves, and each pivot block comprises first and second halves.

3. The vehicle of claim 1, wherein the hydraulic cylinder moves the arms between a stowed position and a deployed position.

4. The vehicle of claim 1, wherein the pivot shaft has a central shaft portion, and a bearing surrounds the central shaft portion.

5. The vehicle of claim 1, wherein the pivot shaft is made of an SAE 1045 hot rolled bar.

6. The vehicle of claim 1, wherein the rear assembly includes a pivot block bracket having a at least one bend and having an extension to which a pivot block is mounted.

7. The vehicle of claim 1, wherein each arm has a first arm end for mounting to the vehicle and a second arm end for mounting to an auxiliary wheel.

8. The vehicle of claim 1, wherein each cylinder block has a cylinder aperture and ends of the cylinder shaft extends through the cylinder apertures.

9. The vehicle of claim 1, wherein each pivot block has a pivot aperture and ends of the pivot shaft extends through the pivot apertures.

10. The vehicle of claim 1, wherein each arm has a generally box shape, and with two side walls, a top wall and a bottom wall.

11. The vehicle of claim 2, wherein shims are placed between the first and second halves of the cylinder block before the cylinder aperture is machined.

12. The vehicle of claim 2, wherein shims are placed between the first and second halves of the pivot block before the pivot aperture is machined.

13. An auxiliary axle system comprising:
   an arm assembly including a pair of arms, an elongate tube extending between the arms and having an end attached to each of the arms, a pair of levers attached to the tube, and cylinder blocks extending between the levers;
   a cylinder assembly including a first cylinder shaft extending between the cylinder blocks and having an end attached to each of the cylinder blocks, a cylinder cross member attached to a frame member, a second cylinder shaft attached to the cylinder cross member, and a hydraulic cylinder having one end attached to the first cylinder shaft and another end attached to the second cylinder shaft;
   a rear assembly including a rear cross member attached to the frame member, a pair of pivot blocks attached to the rear cross member, and a pivot shaft extending between the pivot blocks and having an end attached to each of the cylinder blocks;

wherein the arm assembly is pivotally mounted to the rear assembly and is actuated by the cylinder assembly.

14. The system of claim 13 further comprising an axle assembly coupled to the arm assembly.

15. The system of claim 14 wherein the axle assembly includes:
   an axle member having a pair of ends;
   a pivotal joint at each end of the axle member;
   a rotatable wheel coupled to each pivotal joint; and
   a tie rod coupled with each pivotal joint so that pivotal rotation of each wheel is in unison.

16. The system of claim 15 wherein the axle assembly includes a fender coupled to each pivotal joint so that the fender pivots with the wheel.

17. The system of claim 15 wherein the tie rod is positioned forward of the axle member.

18. The system of claim 14 wherein the axle assembly is bolted to the arm assembly.

19. The system of claim 17 wherein the tie rod is positioned beneath the arm assembly.

* * * * *